United States Patent

[11] 3,588,206

| [72] | Inventor | Ruben E. Frost |
| | | Grand Rapids, Mich. |
| [21] | Appl. No. | 773,474 |
| [22] | Filed | Nov. 5, 1968 |
| [45] | Patented | June 28, 1971 |
| [73] | Assignee | C. L. Frost & Son, Inc. |
| | | Grand Rapids, Mich. |

[54] BEARING CONSTRUCTION
7 Claims, 3 Drawing Figs.

[52] U.S. Cl. .................................................. 308/187.1
[51] Int. Cl. ....................................................... F16c 33/78
[50] Field of Search........................................ 308/187.1,
187.2; 277/83, 173, 177

[56] References Cited
UNITED STATES PATENTS

| 2,689,772 | 9/1954 | Jones Jr. ........................ | 308/187.2 |
| 3,458,207 | 7/1969 | Conti............................. | 308/187.2 |
| 1,722,489 | 7/1929 | Bott............................... | 308/187.1 |
| 2,124,526 | 7/1938 | Goldsworthy................... | 308/187.2 |
| 2,221,553 | 11/1940 | Okun............................. | 308/187.1 |
| 2,250,167 | 7/1941 | Niles............................. | 308/187.1 |
| 2,600,433 | 6/1952 | Saywell.......................... | 308/187.2 |
| 3,010,771 | 11/1961 | Cogger.......................... | 308/187.2 |
| 3,306,687 | 2/1967 | Smith............................ | 308/187.2 |

FOREIGN PATENTS

| 636,923 | 2/1962 | Canada .......................... | 308/187.2 |

Primary Examiner—Milton Kaufman
Assistant Examiner—Frank Susko
Attorney—Price, Heneveld, Huizenga and Cooper ABSTRACT: This disclosure relates to a bearing assembly. Bearing members are positioned between outer and inner race members. An axial shoulder on the outer raceway portion and a groove formed adjacent the inner raceway member cooperate with a flexible, nonmetallic annular sealing ring to seal the bearing from dirt and to retain lubrication within the bearing. The sealing ring preferably fits loosely in the groove to minimize friction and wear.

PATENTED JUN 28 1971

3,588,206

INVENTOR.
RUBEN E. FROST
BY Price, Heneveld
Huizenga & Cooper
ATTORNEY

BEARING CONSTRUCTION

DISCLOSURE

This invention relates to sealed bearing structures. In one of its aspects it relates to a sealed bearing structure having inner and outer race members with bearings therebetween wherein the bearings are sealed by at least one annular flexible nonmetallic sealing member positioned in a groove formed between an end retainer member and an inner race section at an inner radial position and abutting against a radial land of the outer race member to minimize frictional drag of the sealing member and to reduce wear on the sealing member.

In another of its aspects the invention relates to a sealed bearing assembly in which a nonmetallic, self-lubricating, annular sealing member freely floats in a groove in an inner race member and abuts a radial land adjacent the outer raceway in an outer race member to seal bearings positioned between the outer race member and the inner race member.

Many bearing structures have been developed with sealing rings. There are different designs for different size bearings and for different purposes. Small bearing members cannot be so easily formed with complex labyrinth seals because of the difficulty in fabricating and assembling the small parts. The smaller parts require smaller tolerances which are costly to maintain. Smaller bearings usually are inexpensive. The small bearings are provided either with no seal or an inexpensive seal which will not be replaced when the seal wears out. The bearing is usually used until it is worn out through the accumulation of dirt within the bearings. The life of the bearings is therefore dependent on the length of service of the sealing structure.

I have now discovered a new and inexpensive sealed bearing, having a minimum frictional sealing ring which fits into a groove formed between one race member and a retainer at an inner edge and which abuts a radial land adjacent the outer race at an outer radial edge and wherein the sealing means is substantially thinner than the groove and has an inner diameter so as to fit within the groove.

By various aspects of this invention one or more of the following, or other, objects can be obtained.

It is an object of this invention to provide a small bearing assembly which is durable yet inexpensive to manufacture.

It is a further object of this invention to provide a sealed bearing assembly wherein friction from the sealing members is substantially reduced.

It is a further object of this invention to provide a sealed bearing assembly for a cam follower and the like, having an improved wear-resistant sealing member.

Other aspects, objects, and the several advantages of this invention are apparent to one skilled in the art from a study of this disclosure, the drawings, and the appended claims.

According to the invention, there is provided a sealed bearing structure having an annular outer race member, an annular inner race member concentrically positioned within the outer race member, and bearing means between the outer and inner race members permitting relatively frictionless rotation between the outer and inner race members. An outer raceway is provided on the outer raceway member and an inner raceway is provided on the inner raceway member. One of the outer and inner race members has an axial shoulder cut therefrom adjacent an end of the raceway portion forming a radial land between the raceway portion and the shoulder. The other of the outer and inner race members has a retaining flange extending toward the one race member forming a radial groove between the flange and the raceway portion. An annular sealing ring is positioned in the groove and abutting the land, the sealing ring having a thickness substantially less than that of the groove at least where the ring is positioned within the groove, and so shaped as to float within the groove while in abutting relation with the land.

Preferably, the shoulder is formed in the outer raceway member and the groove is formed between the inner raceway portion and a retaining flange. The inner raceway member can be an annular ring or a stud such as used in a cam follower. The bearing structure can have two such sealing rings in the case of a roller bearing or only one such sealing ring in the case of a cam follower.

The invention will now be described with reference to the accompanying drawings in which.

Figure 1:
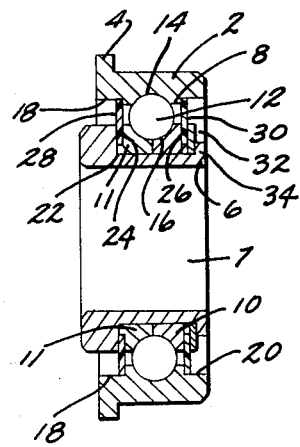
FIG. 1 shows a cross-sectional view through a bearing assembly according to the invention.
Figure 2:
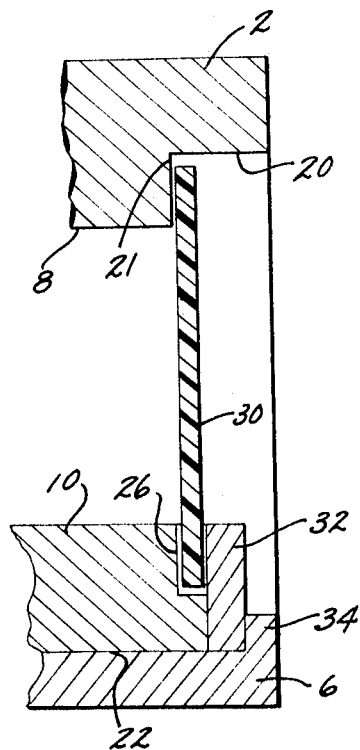
FIG. 2 is an enlarged sectional view of a portion of the assembly shown in FIG. 1.

Referring now specifically to FIGS. 1 and 2, there is shown a bearing assembly comprising an outer race member 2, an inner race member 6, and ball bearing members 12 therebetween. The outer race member 2 has an outer radial flange 4 at one end thereof and an outer raceway portion 8 on the inner annular surface thereof. Annular shoulders 18 and 20 are cut at each edge of the outer race member 2 adjacent the outer raceway portion 8. Radial lands 21 are formed between the outer raceway portion 8 and the annular shoulders 18 and 20. A bearing groove 14 is formed in the outer raceway portion to receive the ball bearings 12. The bearing groove 14 is spherically shaped, having a cross-sectional radius of curvature approximately that of the ball bearings 12.

The inner race member 6 has inner race sections 10 and 11, each having an edge portion cut to form a bearing groove 16 when positioned together. The inner race sections 10 and 11 are positioned within an annular inwardly extending recess 22 cut in the outer edge of the inner race member 6. A radial groove 24 is cut in the outer edge of inner race section 11 and a radial groove 26 is cut into the outer edge of inner race section 10. The radial groove is spherically shaped with a radius of curvature in cross section approximately that of the ball bearings 12. A retaining ring 32 is positioned against the outer edge of inner race section 10. A turned flange 34 holds the retaining ring 32 tightly against the inner race section 10.

Annular sealing rings 28 and 30 are positioned within grooves 24 and 26 respectively, and abut against lands 21. The sealing rings are made preferably of a nonmetallic material having self-lubricating properties. Examples of such material are Teflon, polyethylene, polypropylene, and Nylon.

As seen more clearly in FIG. 2, the inner radial diameter of the sealing ring is somewhat greater than the inner edge diameter of the annular slot 26. Further, the thickness of the sealing ring 30 is substantially less than the thickness of the annular slot 26. The sealing ring 28 has similar dimensions and fits in the corresponding annular slot in the same fashion as that shown for sealing ring 30. The outer diameter of the sealing rings is substantially less than the diameter of the shoulders 18 and 20 but greater than the inner diameter of the outer raceway portion 8. In this manner, the outer portion of the sealing rings abuts the lands 21 to effectively seal the bearings. By this construction, the sealing ring is retained at the edges of the bearing structure but effectively "floats" between the inner and outer race members such that the frictional drag of the sealing ring and the wear on the sealing ring will be minimized.

The thickness of the sealing rings relative to the thickness of the slots 24 and 26 can vary depending on the use. Generally, the thickness of the sealing rings will be about 40 to 90 percent of the thickness of the slots.

Figure 3:
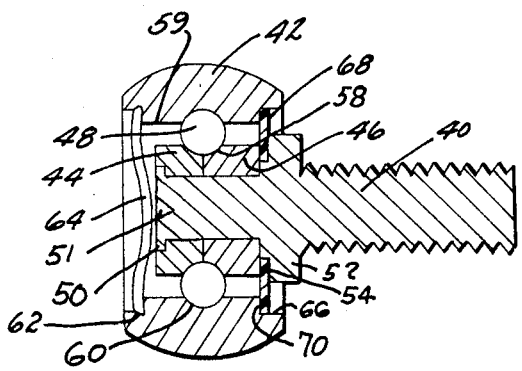
FIG. 3 is a sectional view taken through a second bearing assembly which embodies the invention.

Referring now to FIG. 3, a threaded stud member 40 forms an inner race member and is concentrically positioned within an annular outer race member 42. The threaded stud member 40 has inner annular race sections 44 and 46 positioned within an inwardly extending annular recess in an end of the stud 40. The inner race sections 44 and 46 form at the inner edges a bearing groove 58 for ball bearings 48. A radial flanged end 50 and a shoulder 52 form the edges of the inwardly extending annular recess 56. An annular slot 54 is cut in the edge of shoulder 52 adjacent the inner race section 46.

The outer race member 42 has an outer raceway portion 59 and an annular bearing groove 60 within the raceway portion for positioning ball bearings 48. A counterbore 62 is formed in one edge of the outer race member 42 and contains a sealing disc 64.

An annular shoulder 66 is cut from the other end of the outer race member 42 forming a radial land 70 between the shoulder 66 and the outer raceway portion 59.

A nonmetallic sealing ring 68 of the same type as shown in FIGS. 1 and 2 is positioned within the annular slot 54 formed in shoulder 52 and abuts against radial land 70. The thickness of the annular slot 54 is substantially greater than the thickness of the sealing ring 68. The inner diameter of the sealing ring 68 is substantially more than the diameter of the base of slot 54, and the outer diameter of the sealing ring 68 is substantially less than the diameter of shoulder 66 so that the sealing ring "floats" between the outer and inner race members. The outer diameter of the sealing ring 68 is, of course, greater than the diameter of outer raceway portion 59 so that the sealing ring effectively seals the bearing structure.

The construction shown provides an economical but durable bearing. The inner race member is generally made of relatively soft material whereas the raceway sections such as 10 and 11 of FIGS. 1 and 2 and 44 and 46 of FIG. 3 are made of a bearing material which can be hardened. The bearings are assembled by positioning the inner raceway member within the outer raceway member and then positioning the two sections with the ball bearing, onto the inner race member. In the case of the embodiment shown in FIGS. 1 and 2, the assembly is made by positioning the sealing ring 28 in the groove 24 between the inner race section 11 and the inner race member 6. This assembly is then positioned within the outer race member 2. The ball bearings 12 and the inner race section 6 is then positioned within the outer race member 2. The sealing ring 30 and the retaining ring 32 are then positioned within the outer race member 2 in the position shown in FIGS. 1 and 2. The flange 34 is then turned up against retaining ring 32 so as to complete the assembly holding the retaining ring 32 against the inner race member 10.

In the assembly shown in FIG. 3, the sealing ring 68 is positioned in groove 54 and the inner race section 46 is positioned on the stud member 40. This subassembly is positioned within the outer race member 42 and bearings 48 and inner race member 44 are then added. During this assembly process, the end of the stud member 40 is without the radial flanged end 50. This flanged end is then formed by riveting the end as at 51. The sealing disc 64 is then positioned in groove 62 to complete the assembly.

As an example of how the bearings can be constructed in accordance with the invention, the following exemplary dimensions are given:

|  | Figures 1 and 2 | Figure 3 |
| --- | --- | --- |
| Sealing ring slot width, in | 0.018–0.022 | 0.033–.037 |
| Sealing ring thickness, in | 0.015 | 0.030 |
| Inner Diameter of sealing ring, in | 0.027–0.628 | 0.386–0.387 |
| Diameter of sealing slot, in | 0.620–0.624 | 0.380–0.383 |
| Outer Diameter of sealing ring, in | 0.962–0.963 | 0.689–0.690 |
| Diameter of Shoulder in outer race member, in | 0.966–0.970 | 0.693–0.690 |

Reasonable variation and modification are possible within the scope of the foregoing disclosure, the drawings, and the appended claims to the invention without departing from the spirit thereof.

The embodiments of the invention in which an exclusive property or privilege is claimed are defined as follows.

I claim:

1. A sealed bearing assembly comprising:
   an annular outer race member;
   an inner race member concentrically positioned within said outer race member;
   a bearing means between said outer and inner race members permitting relatively frictionless relative rotation between said outer and inner race members about a central axis;
   said outer race member having a raceway portion on the inner diametral surface for receiving and retaining said bearing means so as to prevent relative axial movement between said raceway portion and said bearing means;
   an axially extending shoulder adjacent said raceway portion extending to an axial end of said outer race member, said shoulder having a diameter greater than the diameter of said raceway portion thereby forming a radial land between an edge of said raceway portion and said shoulder;
   said inner race member having an outer diametral surface for receiving and retaining said bearing means to prevent axial movement of said bearing means with respect to said inner race member;
   retaining means abutting an axial end of said inner race member, said retaining means being disposed in opposing relationship to said shoulder of said outer race member;
   a radially inwardly extending groove formed in one of said retaining means and said inner race member such that said groove is axially positioned between said retaining means and said inner race member, and in opposing relationship to an inner end of said shoulder;
   an annular and flexible nonmetallic and self-supporting sealing ring in said groove abutting said radial land and having an outer diameter less than the diameter of said shoulder; and
   said inner diameter of said annular nonmetallic sealing ring being greater than the outer diameter of said groove, and the axial thickness of said ring at the inner portion thereof being substantially less than the axial thickness of said groove so that said ring floats freely within said groove.

2. The bearing assembly of claim 1 wherein said bearing means are ball bearings, said raceway portion of said outer race member and said inner race member having opposed spherically shaped radial grooves with a radius of curvature approximating that of said ball bearings for receiving said ball bearings between said outer raceway portion and said inner race member.

3. The bearing assembly of claim 1 wherein said inner race member comprises a stud with a radial shoulder forming said retaining means.

4. A bearing assembly according to claim 1 wherein said inner race member comprises an annular ring with a central bore.

5. A bearing assembly according to claim 1 wherein said inner race member comprises a pair of abutting annular rings, each forming a portion of a groove for said bearing means.

6. The bearing assembly of claim 4 wherein a second groove is formed at the other axial end of said inner race member for receiving a second sealing ring, a second shoulder is formed in said outer axial end of said outer race member forming a second land between the outer end of said raceway portion and said shoulder, said second shoulder being disposed in opposing relationship to said second groove, and a second sealing ring is positioned in said second groove whereby said bearing means is sealed by said sealing rings at both ends of said bearing means.

7. A sealed bearing assembly comprising:
   an annular outer race member;
   an inner race member concentrically positioned within said outer race member;
   bearing means positioned between said outer and inner race member permitting relatively frictionless relative rotation between said outer and inner race members about a central axis;
   means on said outer and inner race members retaining said bearing means therebetween and preventing axial movement between said race members and said bearing means;

one of said outer and inner race members having an axial shoulder cut therefrom forming a land between said axial shoulder and a raceway portion of said race member;

the other of said outer and inner race members having a member forming a retaining flange extending toward the one of said outer and inner race members forming a radial groove therebetween, said radial groove being in opposing relationship to said axial shoulder;

an annular sealing ring positioned in said groove and abutting said land, said sealing ring being constructed of a single piece of nonmetallic, self-lubricating and self-supportable material having a thickness substantially less than that of said groove at least when said ring is positioned within said groove and so shaped as to float within said groove while in abutting relationship with said land by which wear on said sealing ring and frictional drag by said sealing ring is substantially reduced.

PO-1050
(5/69)

UNITED STATES PATENT OFFICE
CERTIFICATE OF CORRECTION

Patent No. 3,588,206        Dated June 28, 1971

Inventor(s) Ruben E. Frost

It is certified that error appears in the above-identified patent and that said Letters Patent are hereby corrected as shown below:

Column 3, line 59:

"0.027-0.628" should be --- 0.627-0.628 ---.

Column 4, line 29:

After "nonmetallic" insert --- self-lubricating ---.

Signed and sealed this 21st day of December 1971.

(SEAL)
Attest:

EDWARD M. FLETCHER, JR.      ROBERT GOTTSCHALK
Attesting Officer               Acting Commissioner of Patents